US009469806B2

(12) United States Patent
Villalobos et al.

(10) Patent No.: US 9,469,806 B2
(45) Date of Patent: Oct. 18, 2016

(54) SINTERING AID COATED YAG POWDERS AND AGGLOMERATES AND METHODS FOR MAKING

(71) Applicants: Guillermo R. Villalobos, Springfield, VA (US); Jasbinder S. Sanghera, Ashburn, VA (US); Woohong Kim, Lorton, VA (US); Shyam S. Bayya, Ashburn, VA (US); Bryan Sadowski, Falls Church, VA (US); Ishwar D. Aggarwal, Charlotte, NC (US)

(72) Inventors: Guillermo R. Villalobos, Springfield, VA (US); Jasbinder S. Sanghera, Ashburn, VA (US); Woohong Kim, Lorton, VA (US); Shyam S. Bayya, Ashburn, VA (US); Bryan Sadowski, Falls Church, VA (US); Ishwar D. Aggarwal, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 783 days.

(21) Appl. No.: 13/707,271

(22) Filed: Dec. 6, 2012

(65) Prior Publication Data
US 2014/0004261 A1 Jan. 2, 2014

Related U.S. Application Data

(62) Division of application No. 12/536,626, filed on Aug. 6, 2009, now abandoned.

(51) Int. Cl.
| | | |
|---|---|---|
| C09K 11/02 | (2006.01) | |
| C04B 35/44 | (2006.01) | |
| C04B 35/626 | (2006.01) | |
| C04B 35/628 | (2006.01) | |
| C04B 35/645 | (2006.01) | |

(52) U.S. Cl.
CPC ............ *C09K 11/025* (2013.01); *C04B 35/44* (2013.01); *C04B 35/6281* (2013.01); *C04B 35/62655* (2013.01); *C04B 35/62807* (2013.01); *C04B 35/62828* (2013.01); *C04B 35/62886* (2013.01); *C04B 35/62897* (2013.01); *C04B 35/645* (2013.01); *C04B 2235/3222* (2013.01); *C04B 2235/3224* (2013.01); *C04B 2235/3225* (2013.01); *C04B 2235/9653* (2013.01)

(58) Field of Classification Search
CPC .............. C04B 2235/3222; C04B 2235/3224; C04B 35/44; C04B 35/50; C04B 35/62828; C04B 35/62897; C04B 35/645
USPC ......................................................... 427/215
See application file for complete search history.

(56) References Cited

U.S. PATENT DOCUMENTS

| 5,660,773 A * | 8/1997 | Stangle .................. B82Y 30/00 264/125 |
| 2008/0164626 A1* | 7/2008 | Zimmer ................. B82Y 30/00 264/1.21 |

OTHER PUBLICATIONS

Wen et al. "Synthesis of nanocrystalline yttria powder and fabrication of transparent YAG ceramics". J. Eur. Ceram. Soc., 2004, 24, 2681-2688.*

*Primary Examiner* — Alexander Weddle
(74) *Attorney, Agent, or Firm* — US Naval Research Laboratory; Stephen T. Hunnius

(57) ABSTRACT

Method of Making particles including a YAG core and a coating of sintering aid deposited thereon. The particles and agglomerates thereof maybe formed as a powder. The coated YAG-containing particles are well-suited to production of polycrystalline YAG-containing ceramics. The coated YAG-containing particles may be fabricated using a novel fabrication method which avoids the need for formation of a homogeneous powder mixture of YAG and sintering aid. The mixture may be sprayed into a drying column and dried to produce coated particles. Alternatively, the YAG particles and sintering aid or sintering aid precursor solution may be separately introduced to the drying column and dried to form coated YAG-containing particles.

18 Claims, 1 Drawing Sheet

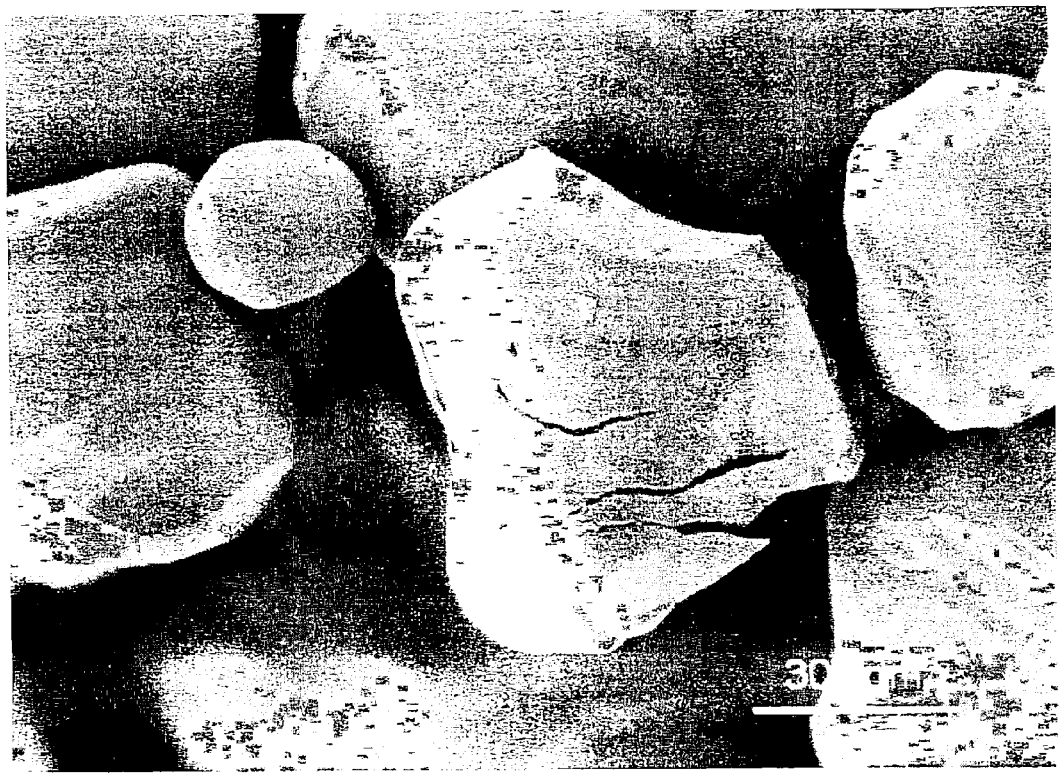
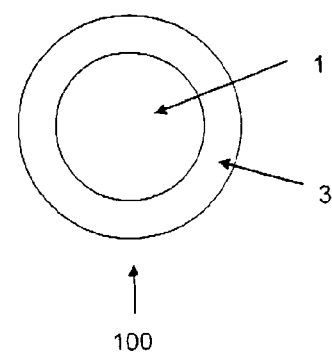
100

SINTERING AID COATED YAG POWDERS AND AGGLOMERATES AND METHODS FOR MAKING

This application claims priority to and the benefits of U.S. patent application Ser. No. 12/536,626 filed Aug. 6, 2009 which is incorporated herein by reference.

BACKGROUND OF THE INVENTION

1. Field of the Invention

The present invention relates to the field of yttrium aluminate garnet (YAG) particles. In particular the present invention relates to yttrium aluminate garnet particles coated with a sintering aid for use in fabricating ceramics.

2. Description of the Related Technology

Hard, strong and thermally conductive YAG particles are generally used to fabricate ceramics used in the semiconductor and optics industry. Although single crystal YAG particles are widely used to construct single crystal laser hosts, these crystals are expensive to manufacture, too small in size and do not provide sufficiently good beam quality to be used in high power lasers of greater than about 5 kW. By contrast, polycrystalline materials possess good beam quality and can be made in large sizes.

Processing YAG particles to form polycrystalline YAG ceramics overcomes many of these limitations. Traditional processing of polycrystalline YAG ceramics, however, leads to high scattering and absorption losses that are distributed in localized yet random regions. Polycrystalline YAG materials produced by this method do not posses uniform optical loss and therefore have a poor yield. Furthermore, traditional processing is expensive and inadequate for producing large sized polycrystalline YAG ceramics or materials having different shapes. Consequently, YAG materials produced by this method are unsuitable for many applications, including construction of high power lasers.

One of the primary problems with traditional processing is the difficulty involved in sintering YAG-containing materials. In general, sintering is the act of consolidating powder into a dense shape. The powder being sintered cannot melt to a great extent, although some melting of the secondary phase in the powder or surface melting is allowed under this definition. If the material melts, the process is referred to as fusion casting. Sintering, either with pressure, i.e. hot pressing, or without pressure, requires a vast amount of material transport to consolidate an aggregate of loose powder particles into a dense shape. In the case of porcelains and clay products, the secondary phases of these materials melt and bind the primary solid particles together with a glass phase; these types of systems were the first to be used due to their ease of sintering. However, advanced ceramics do not have these intrinsic sintering aids and thus sintering aids must therefore be added to the materials.

Sintering aids work in a variety of fashions. They may liquify at or somewhat below the primary material's densification temperature thereby promoting liquid phase sintering. Certain sintering aids exhibit higher solid-state diffusion coefficients than the primary material's self-diffusion. The sintering aid may conversely have a lower solid-state diffusion coefficient that prevents exaggerated grain growth and promotes grain boundary refinements and pinning. The sintering aid may also simply clean or etch the primary material's surfaces thereby enhancing solid-state diffusion.

Recently, sintering aids have been used to facilitate processing of YAG particles by enhancing densification and assisting sintering. In general, these sintering aids tend to be solid inorganic particles, such as silica. Since the YAG particles are also solid inorganic particles, the sintering aid and YAG particles must be mixed homogeneously for the sintering aid to be effective. To date this has typically been accomplished by some form of mechanical mixing. For small samples, the mixing may involve the use of a mortar and pestle. In larger samples ball milling, attritor milling, high shear wet milling, and variations or combinations of these methods may accomplish mixing. However, due to the nature of this type of particle-particle interaction, none of these mechanical mixing methods produce a homogenous mixture wherein the silica adequately coats the YAG particles. Furthermore, mechanical mixing has the added problem of contaminating the YAG with the milling material. Inhomogeneity results in areas having too much, too little or no sintering aid and causes significant problems in the fabrication of transparent ceramics, electronic ceramics, and refractory ceramics. Consequently, the ceramic materials produced from these YAG particles typically contain inhomogeneous regions as well as opaque regions having low yield that must be drilled out and removed. This can be expensive and lead to small sized ceramic products. Production of uniform and highly transparent polycrystalline YAG products therefore depends upon the uniform mixture of YAG particles and sintering aids, which as discussed above, is typically non-ideal when mechanical mixing methods are employed.

The use of solutions and suspensions including YAG particles and sintering aids for fabricating polycrystalline YAG products has also been investigated. These investigations have demonstrated that the production of a high yield and uniform ceramic depends on uniformly coating the YAG particles with the sintering aids so that the YAG particles do not substantially directly contact one another. Merely creating a solution or suspension of YAG particles and a sintering aid is insufficient to achieve this effect. Rather, further processing is required of these solutions and suspensions to produce a uniform coating.

For example, U.S. Patent application publication no. 2005/0281302 (Lee), disclose a transparent polycrystalline YAG material that may be doped with rare earth elements for use in lasing systems. The material was fabricated by dispersing YAG powders in a solution of ethyl alcohol and TEOS or colloidal silica, and the resultant suspension was dried under stirring and subsequently calcinated. The process of stirring and calcinating a YAG particle and silica precursor solution alone, however, does not produce a uniform coating of silica on the YAG particles. Although this process provides a better distribution of silica on the YAG particles in comparison to mechanical mixing, there are still areas on the YAG particles with either too much or not enough silica sintering aid. Consequently, Lee does not teach a method for producing a uniform coating of silica on YAG particles. In Lee's method, adjacent YAG particles can be directly in contact with each other.

Similarly, U.S. Patent application publication no. 2007/0182037 (Rabinovitch) discloses a transparent ceramic constructed from YAG that is produced by suspending doped YAG particles in deionized water and colloidal silica, agitating the solution and subsequently filtering out and compacting the resultant YAG particles. Rabinovitch employs a particulate silica suspension but does not indicate that the silica particles were deposited the YAG particles to establish a uniform coating. Notably, the resulting silica coating is less uniform than that taught by Lee. Rabinovitch, therefore, does not teach a method for producing an adequate uniform coating of silica on YAG particles. In Rabinovitch's method, adjacent YAG particles can be directly in contact with each other.

U.S. Pat. No. 7,449,238 (Villalobos) discloses yttria particles coated with LiF. According to Villalobos, a LiF salt is dissolved in water and caused to precipitate on the particle as the particle is dried. Unfortunately there are no commercially suitable salts that produce $SiO_2$ without calcination at temperatures above 700° C. and long residence times measured in hours. The maximum temperatures of spray dryers are in the 500° C. range and the residence times are measured in seconds instead of hours. Although a salt could be precipitated on the particles, subsequent heat treatment at 700° C. for 2 hours to form $SiO_2$ would produce hard agglomerates that do not sinter and would also cause spalling of the coating. Therefore, Villalobos does not provide a teaching for creating a substantially uniform silica coated YAG particle. By contrast, applying a uniform coating of silica to a YAG particle, involves a distinctly different chemical process that requires binding the silica to the YAG particle surface. Consequently, the coating method disclosed in Villablobos would not be applicable to establishing a uniform silica based coating. Additionally, Villalobos does not suggest that its coating method would be compatible with YAG particles.

Therefore, there is a need in to develop YAG particles suitably coated with a sintering aid in order to enhance the reproducibility of production of polycrystalline YAG products.

There is also a need for methods for making such coated YAG particles that do not require the advance preparation of a homogenous mixture of silica and YAG particles.

SUMMARY OF THE INVENTION

The present invention is directed to YAG particles coated with a sintering aid. In a first aspect, the invention is directed to a particle having a core including YAG and a sintering aid coated on a surface thereof, wherein the coating is sufficiently continuous to substantially prevent a large number of sites where another core may come into contact with the coated YAG-containing core.

The invention is also directed to a method for forming a particle comprising the steps of: preparing a solution including YAG particles and a sintering aid precursor in a solvent, mixing the solution to form a slurry, spraying the slurry and drying the sprayed slurry to form a coating of the sintering aid on the YAG particles.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWING

FIG. 1 is a schematic representation of a silica coated YAG particle.

DETAILED DESCRIPTION OF THE PREFERRED EMBODIMENT(S)

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Thus, for example, reference to "a particle" may include a plurality of particles and equivalents thereof known to those skilled in the art, and so forth. As well, the terms "a" (or "an"), "one or more" and "at least one" can be used interchangeably herein. It is also to be noted that the terms "comprising", "including", "composed of" and "having" can be used interchangeably.

For purposes of the present invention, the "coating" of one or more sintering aids herein refers to applying a sufficient amount of one or more sintering aids on a particle core in an arrangement that substantially prevents direct contact of the coated particle core with other coated particle cores. The coating should be sufficiently continuous and/or have a sufficient thickness that the coating minimizes the number of sites where coated particle cores can come into contact with one another without an intervening layer of a sintering aid. The coating should be sufficient to prevent a large number of sites where a YAG-containing core comes into contact with another core. While the coating may be hermetic and/or continuous, this is not necessary to achieve a useful coating. In an exemplary embodiment, the sintering aid may be intermittently and strategically deposited on the surface of a particle core so as to minimize the number sites where particle cores directly contact one another. For example, in one embodiment, although discontinuous, the sintering aid coating may be substantially thick and/or the uncoated surface of the particle core may be sufficiently small so as to prevent direct contact with other particulate cores.

For purposes of the present application, "boiling" as used herein includes heating a solvent to a temperature above the boiling point as well as conditions that cause rapid and significant evaporation of the solvent to prevent the formation of a sintering aid coating of salt on the YAG particles.

For purposes of the present application, "aerosol," includes the slurry material present both before and after any evaporation of solvent.

For purposes of the present application, "spalling," refers to when the outer portion of a liquid coating of solution first dries to form a crust around the still liquid inner portion of the coating. When solvent later evaporates from the inner portion, the gaseous expansion optionally blows off the crust, creating an incompletely coated particle.

The present invention is directed to novel coated yttrium aluminate garnet (YAG) particles. As used herein, references to "YAG particles" and "YAG cores" include both particles and cores made of substantially pure YAG, as well as particles and cores containing YAG and some amount of other materials such as dopants. The YAG particles are coated with a sintering aid. The present invention is also directed to methods for making the coated YAG particles. As shown in the exemplary embodiment of FIG. 1, the coated particle 100 of the present invention includes a core 1 composed of YAG and has a layer of one or more sintering aids 3 coated on the surface of core 1. Because the coating substantially prevents direct contact between the YAG cores 1 of the particles 100, powders composed of particles 100 and agglomerates thereof may be used to manufacture dense, highly transparent and uniform polycrystalline YAG ceramic materials. It is envisioned that particles 100 and ceramic products formed therefrom may have a wide variety of applications in the fields of semiconductors and optics.

Core 1 of coated particle 100 includes YAG. In one embodiment, the YAG may be undoped. Alternatively, the YAG may be doped with one or more dopants. Exemplary dopants may include rare earth elements, such as Nb, Yb, Er or other rare earth elements and combinations thereof. In an exemplary embodiment, the dopant may be present in an amount up to about 10% by weight of particle 100, preferably about 1% to about 2% by weight of particle 100.

Core 1 may have any suitable shape, size or configuration. The cores may be, but are not limited to, approximately spherical or elliptical shapes. In an exemplary embodiment, core 1 may have a diameter in the range of about 10 nm to about 100 um, preferably about 100 nm to about 30 um.

A coating of one or more sintering aids 3 is disposed about a surface of core 1 to facilitate sintering, reduce porosity and decrease exaggerated grain growth. Sintering aid 3 may include any material suitable for facilitating sintering. In an exemplary embodiment, the sintering aid may be silica, a lithium salt, magnesium oxide or combination thereof. Exemplary sintering aids may include aluminum fluoride and lithium fluoride. As shown in FIG. 1, sintering aid 3 preferably coats the surface of core 1 so as to minimize the possibility that particle core 1 directly contacts another particle core 1, after coating is complete. In one embodiment, the coating may be continuous and/or hermetic. Alternatively, the coating may be intermittent while substantially preventing contact between two coated YAG cores 1. For example, a thick coating with small holes will successfully prevent two YAG cores from contacting one another. The thickness of the coating of sintering aid 3 may be uniform or may vary over the surface of core 1. Preferably, the sintering aid 3 is homogenously distributed over the surface of core 1 on a nanometer scale so as to create a substantially uniform coating thickness. In an exemplary embodiment, the selected sintering aid is silica, and the silica coating 3 may have a thickness of from about 1 nm to about 500 um, more preferably about 10 nm to about 200 um.

Coated particles 100 and agglomerates thereof have a number of advantages and may be used for a wide variety of applications. Specifically, the combination of a YAG particle core 1 and a coating of one or more sintering aids enable fabrication of high yield ceramics with no or minimal light scattering sites. This allows a reduction in the total amount of sintering aid used and consequently reduces the amount of unwanted reaction byproducts that are left in the material as scattering sites. The coating of the sintering aid also substantially simplifies the densification process during ceramic fabrication, enabling densification under less harsh conditions than are traditionally used in order to achieve highly dense and uniform shapes of hard to sinter materials. Consequently, the coated YAG particles, agglomerates and powders of the present invention may be used to reproducibly and economically construct highly dense, transparent polycrystalline YAG monoliths as well as ceramics that may be useful in the semiconductor and optical field. Specifically, coated particles 100 may be particularly useful for constructing polycrystalline YAG ceramics to be used in optical fibers and lasers.

The invention is further directed to novel methods for making coated YAG-containing particles 100. Unlike the prior art, it is not necessary to prepare a homogenous mixture of dry particulate sintering aid and YAG particles in order to implement the present invention. Rather, a coating of sintering aid 3 on YAG-containing core 1 may be achieved by depositing a sintering aid 3 on a surface of core 1 using a novel spray and column-based drying process. Unlike prior art references that teach randomly precipitating a sintering aid precursor solution, such as TEOS, the present method uses a spray drying technique that forces the sintering aid precursor solution to precipitate in a spray droplet form, uniformly deposit on and contain YAG-containing cores 1. This process produces a substantially uniform coating of sintering aid 3 on the YAG-containing cores 1. The resultant coated particles 100 further have a lower melting point than that of untreated YAG particles, thereby enabling high liquid phase transport when sintering and fabricating YAG based materials.

The method of the present invention involves preparing a sintering aid and YAG-containing particle slurry and subsequently coating the YAG-containing particles with the sintering aid. The resultant coated particles 100 and agglomerates thereof may then be shaped to form a ceramic product.

In one embodiment, doped or undoped YAG particles may be added to and mixed with a precursor solution for a sintering aid to form a slurry. Exemplary precursor solutions may include tetraethoxysilane (TEOS), tetramethoxysilane, alkoxy silanes, silicate oxides and combinations thereof. In a similar manner, various magnesium alkoxides can be used to form MgO coatings such as magnesium-s-butoxide, magnesium ethoxide and combinations thereof. Exemplary precursor solutions for forming fluoride salt sintering aids may also be formed by simply dissolving fluoride salts in water or another liquid. The fluoride salt can be made to precipitate by boiling off the liquid. In this invention, the sintering aid is dissolved in the slurry prior to spray drying. The use of undissolved sintering aids in the slurry is not preferred.

The slurry may further include a solvent selected based on the sintering aid precursor solution. Exemplary solvents may include ethanol, methanol, isopropyl or combinations thereof. At this point, the sintering aid should be completely dissolved in the slurry and should not precipitate until the coating, i.e. spraying, step. The YAG particles, however, should not dissolve in the solvent. Premature contact between a precipitated sintering aid and YAG particle may produce inhomogeneous regions that cause scattering in ceramics fabricated from these particles. In an exemplary embodiment, the slurry may be diluted with a compound to optimize the concentration of the solution. Exemplary diluents may include ethyl alcohol, other compatible alcohols, additional water or combinations thereof.

The sintering aid, e.g. silica may subsequently be coated on the YAG particles by spraying and heat processing the slurry. In one embodiment, the YAG particles, sintering aid precursor and solvent are mixed together to form a slurry that is sprayed into a heated drying chamber having any suitable shape, such as a drying column. The slurry may enter the column as an aerosol under thermal conditions that avoid boiling the solvent. In an exemplary embodiment, the slurry may be sprayed into the column at a rate of about 15 ml/min. Sintering aid 3 does not precipitate until the aerosol moves through the spray drying column. In an exemplary embodiment, the aerosol enters the column at temperature of about room temperature to about 180° C., preferably about room temperature to about 150° C. Slightly elevated temperatures may alternatively used. Additionally, an ultrasonic spray head may optionally be used to spray the slurry into the drying column.

In an alternative embodiment, mixing and spraying may occur simultaneously when the YAG particles and the sintering aid precursor solution are separately sprayed into the drying column to accomplish mixing in the drying column itself. Other ingredients may optionally be added during the mixing and spraying process. In one non-limiting example, various components of the slurry are separately sprayed into the drying column. To enhance sprayability, the YAG particles may be optionally mixed with a liquid that immediately evaporates upon entering the column or otherwise does not significantly affect the coating process.

After spraying, the aerosol moves through the column or, if the column is vertically disposed, falls down the column. As the aerosol moves, the thermal conditions in the column are such as to evaporate the solvent, so that the sintering aid reaches a saturation point and subsequently precipitates from the slurry and deposits on the surface of the YAG particles to form a coating. The thermal conditions and spraying rate may be selected to substantially avoid spalling. In general, higher temperatures or rapid increases in temperature may cause spalling. If the slurry spray droplets are dried too fast, the deposited silica will fall off the particles. If the temperature is not sufficiently hot, the silica will remain wet, and the particles will stick together rather than precipitating to form a coating on the YAG particles. In one embodiment, the temperature may be set to about 350° C. In another exemplary embodiment, the drying column may have a temperature gradient, wherein the temperature of the column increases from about 200° C. to about 500° C. as the aerosol travels through the column. This may or may not be a linear change in temperature. Other gradients or multiple gradients may also be used. In an alternative embodiment, the column may have three temperature gradients of about 190° C. to about 300° C., 375° C. to about 415° C. and 390° C. to about 430° C. In an exemplary embodiment, the particle speed through the column may be about 0.3 to about 30 msec with a residence time of about 0.1 to about 10 sec.

After spraying, the resulting coated YAG particles may be collected in a cyclone separator. If necessary, the coated particles may also be heat treated after fabrication in different environments, such as air or oxygen, to reoxidize all or portions of the materials in the coated particles.

Optionally, the resultant YAG particles coated with a sintering aid may be subsequently formed and shaped into a ceramic material. The process of shaping the coated YAG particles may or may not involve application of pressure and/or heat. Exemplary shaping methods may involve hot pressing, pressing or packing the particles 100 or agglomerates. In one embodiment, the sintering aid coated particles may be sintered at about 1450° C. for about 2 hours Exemplary sintering temperatures may be in the range of about 1300° C. to about 1900° C. with soaking times of about 30 minutes to about 24 hours and ramp rates of about 1° C./min to about 50° C./min. Optionally, the sintering temperature may be held at one or more temperatures to facilitate the removal of volatile species and sintering aid related products. In addition to shaping, the application of heat may also function to remove any unwanted impurities, such as carbon, hydrocarbons, alcohols and other volatiles species. In an exemplary embodiment, the resultant shaped ceramic material may be a high yield, transparent, dense polycrystalline YAG material that is at least about 98% above bulk transmission that enables transmission of light in the visible and infrared wavelength regions.

EXAMPLES

Example 1

In a first example, $SiO_2$ was coated on undoped YAG particles.

The coated particles were produced by first preparing a tetraethoxysilane (TEOS) stock solution that was made by mixing about 0.08 ml TEOS, about 30 ml ethanol, about 0.2 ml water and about 0.62 ml HCL. One gram of YAG particles was then mixed with about 2.1 ml of the TEOS stock solution and about 600 ml of ethanol to produce a slurry.

The slurry was then sprayed into a drying column at a temperature of about 350° C. and at a rate of about 15 m/min. The drying column was constructed as a vertical glass tube about 3 m long having a diameter of about 15 cm with an ultrasonic atomizer positioned at the top and a cyclone separator, including a fan to create a downward suction, positioned at the bottom of the tube. The slurry was pumped into the atomizer using a piston pump.

Three furnaces were positioned along the length of the sprayer. The first furnace produced a temperature region having temperatures ranging from about 190° C. to about 300° C. with the temperature increasing in the downstream direction. The second furnace produced a temperature region having temperatures ranging from about 375° C. to about 415° C., with the temperature increasing in the downstream direction, and a third furnace produced a temperature region having temperatures ranging from about 390° C. to about 430° C., with the temperature increasing in the downstream direction. As the solvents evaporate while falling through the drying column, the silica reached saturation, precipitated and deposited on the YAG particles to form a coating. In general, the slurry aerosol moved through the drying tube at a rate of from about 0.3 m/sec to about 30 m/sec with a residence time of about 0.1 sec to about 10 sec. The resultant coated particles were collected in a cyclone separator.

X-ray diffraction of the coated powder showed the presence of YAG and a broad amorphous signal resulting from silica. SEM analysis of the coated particles showed the presence of a uniform coating, while EDS tests verified the presence of Y, Al, Si and O.

The silica coating enabled the subsequent hot pressing of the YAG particles in an inert atmosphere to form a shaped transparent ceramic that was above 98% bulk transmission in the visible and infrared wavelength region. The ceramic was produced by placing the coated YAG particles in a grafoil-lined graphite hot press die. The die was placed in an argon/vacuum atmosphere hot press. Minimal pressure was applied to the die until densification was initiated. The powder was then heated gradually at a rate of from about 20° C./min to about 1500° C./min until it formed a fully densified and transparent shaped ceramic. The heating elements were then turned off to allow natural cooling of the hot press, and the hydraulic motor was turned off to allow the pressure to bleed off.

Example 2

In this example, $SiO_2$ was coated on YAG particles doped with 1% by weight Nd, based on the total weight of the combination of YAG and Nd (as $Nd_2O_3$).

The particles were produced by first preparing a tetraethoxysilane (TEOS) stock solution that was made by mixing about 0.08 ml TEOS, about 30 ml ethanol, about 0.2 ml water and about 0.62 ml HCL. The TEOS stock solution was further diluted with ethyl alcohol. One gram of YAG particles doped with 1% by weight of Nd (as $Nd_2O_3$) was then mixed with about 2.1 ml of the TEOS stock solution and about 600 ml of ethanol to produce a slurry. The slurry was then processed in accordance with the same procedure as that disclosed in Example 1.

Example 3

In this example, $SiO_2$ was coated on YAG particles doped with 1% by weight Yb, based on the total weight of the combination of YAG and Yb (as $Y_2O_3$).

The particles were produced by first preparing a tetraethoxysilane (TEOS) stock solution that was made by mixing about 0.08 ml TEOS, about 30 ml ethanol, about 0.2 ml water and about 0.62 ml HCL. The TEOS stock solution was further diluted with ethyl alcohol. One gram of YAG particles doped with 1% by weight of Yb particles was then mixed with about 2.1 ml of the TEOS stock solution and about 600 ml of ethanol to produce a slurry. The slurry was then process in accordance with the same procedure as that disclosed in Example 1.

Example 4

In a second example, $SiO_2$ was coated on YAG particles doped with 8% by weight Nd, based on the total weight of the combination of YAG and Nd (as $Nd_2O_3$).

The particles were produced by first preparing a tetraethoxysilane (TEOS) stock solution that was made by mixing about 0.08 ml TEOS, about 30 ml ethanol, about 0.2 ml water and about 0.62 ml HCL. The TEOS stock solution was further diluted with ethyl alcohol. One gram of YAG particles doped with 8% by weight of Nd (as $Nd_2O_3$) was then mixed with about 2.1 ml of the TEOS stock solution and about 600 ml of ethanol to produce a slurry. The slurry was then processed in accordance with the same procedure as that disclosed in Example 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for forming a coated particle comprising YAG, said method consisting of the steps of:
   preparing a solution comprising ethanol, water, HCL and a sintering aid or sintering aid precursor;
   mixing YAG-containing particles with said solution and ethanol to form a slurry;
   spraying the slurry into a drying column at a temperature of about 350° C. wherein the drying column was constructed as a vertical glass tube;
   positioning an ultrasonic atomizer at the top of the drying column;
   positioning a fan at the bottom of the drying column;
   creating a downward suction;
   evaporating the solvents as the slurry falls through the drying column;
   achieving saturation of the sintering aid or sintering aid precursor;
   precipitating and depositing on the YAG particles a coating;
   drying said mixture to form YAG-containing particles with a coating of sintering aid on a surface thereof wherein said coating of sintering aid is continuous and prevents sites where another YAG-containing particle may contact the coated YAG-containing particle beneath the coating of the coated particle;
   wherein if the solution comprises a sintering aid precursor the sintering aid precursor comprises a material selected from the group consisting of silicon dioxide, fluoride salt, magnesium oxide and combinations thereof; and
   sintering and producing a transparent YAG ceramic.

2. The method of claim 1, wherein said sintering aid precursor is selected from the group consisting of: tetraethoxysilane, tetramethoxysilane, alkoxy silanes, silicate oxides and combinations thereof.

3. The method of claim 1, wherein said drying step is carried out at a temperature of from about 200° C. to about 500° C.

4. The method of claim 1, wherein said drying step gradually increases the temperature from a first temperature to a higher temperature.

5. The method of claim 4, wherein said YAG-containing particles comprise a dopant.

6. The method of claim 5, wherein said dopant is selected from the group consisting of Yb, Nd, Er and combinations thereof.

7. The method of claim 5, further comprising the steps of heat treating said coated YAG-containing particles and fabricating a transparent shaped polycrystalline YAG ceramic.

8. The method of claim 5, wherein a core comprises less than about 10% by weight of the dopant.

9. The method of claim 8, wherein said core comprises from about 1% to about 2% by weight of the dopant.

10. The method of claim 5, wherein the fluoride salt is selected from the group consisting of aluminum fluoride and lithium fluoride.

11. The method of claim 5, wherein a core has a diameter of from about 10 nanometers to about 100 microns and wherein said coating has a thickness of from about 1 nanometer to about 500 microns.

12. The method of claim 1, wherein the YAG-containing particles are mixed with the sintering aid solution to form a slurry and further including the step of spraying said slurry into a drying column for said drying step.

13. The method of claim 1, wherein additional YAG-containing particles are provided to said drying step separately from said sintering aid solution.

14. A method for forming a coated YAG-containing particle comprising the steps of:
   preparing a solution comprising a sintering aid or silica precursor;
   mixing YAG-containing particles comprising a dopant with said solution to form a slurry;
   spraying said slurry into a drying column wherein the drying column was constructed as a vertical glass tube;
   positioning an ultrasonic atomizer at the top of the drying column;
   positioning a fan at the bottom of the drying column;
   creating a downward suction;
   evaporating the solvents as the slurry falls through the drying column;

achieving saturation of the sintering aid or silica precursor;

precipitating and depositing on the YAG particles a coating;

increasing the temperature to a range of from about 200° C. to about 500° C.;

drying said mixture to form YAG-containing particles with a coating of sintering aid on a surface thereof wherein said coating of sintering aid is continuous and prevents sites where another YAG-containing particle may contact the coated YAG-containing particle beneath the coating of the coated particle; and wherein if the solution comprises a sintering aid precursor the sintering aid precursor comprises a material selected from the group consisting of silicon dioxide, fluoride salt, magnesium oxide and combinations thereof; and sintering and producing a transparent YAG ceramic.

15. The method of claim 14, wherein additional YAG-containing particles are provided to said drying step separately from said sintering aid solution.

16. The method of claim 14, wherein a core comprises from about 1% to about 2% by weight of the dopant.

17. The method of claim 14, further comprising the steps of heat treating said coated YAG-containing particles and fabricating a transparent shaped polycrystalline YAG ceramic.

18. The method of claim 14, wherein a core has a diameter of from about 10 nanometers to about 100 microns and wherein said coating has a thickness of from about 1 nanometer to about 500 microns.

* * * * *